(12) United States Patent
Jogand-Coulomb

(10) Patent No.: US 11,968,526 B2
(45) Date of Patent: Apr. 23, 2024

(54) IDENTITY MANAGEMENT ON A MOBILE DEVICE

(71) Applicant: HID Global CID SAS, Suresnes (FR)

(72) Inventor: Fabrice Jogand-Coulomb, Aix en Provence (FR)

(73) Assignee: HID Global CID SAS, Suresnes (FR)

( * ) Notice: Subject to any disclaimer, the term of this patent is extended or adjusted under 35 U.S.C. 154(b) by 316 days.

(21) Appl. No.: 17/310,457

(22) PCT Filed: Feb. 5, 2020

(86) PCT No.: PCT/EP2020/052900
§ 371 (c)(1),
(2) Date: Aug. 4, 2021

(87) PCT Pub. No.: WO2020/161203
PCT Pub. Date: Aug. 13, 2020

(65) Prior Publication Data
US 2022/0109986 A1    Apr. 7, 2022

Related U.S. Application Data

(60) Provisional application No. 62/801,371, filed on Feb. 5, 2019.

(51) Int. Cl.
| | |
|---|---|
| *H04L 29/06* | (2006.01) |
| *H04L 9/40* | (2022.01) |
| *H04W 12/06* | (2021.01) |

(52) U.S. Cl.
CPC ........... *H04W 12/06* (2013.01); *H04L 63/123* (2013.01)

(58) Field of Classification Search
CPC ... H04L 63/0853; H04L 63/123; G06F 21/35; G06F 21/33; G06F 2221/2113; G06F 21/32; H04W 12/06
See application file for complete search history.

(56) References Cited

U.S. PATENT DOCUMENTS

| | | | |
|---|---|---|---|
| 2008/0222425 A1* | 9/2008 | Buss | ................... H04L 63/0823 |
| | | | 713/185 |
| 2015/0341370 A1* | 11/2015 | Khan | ...................... H04L 63/20 |
| | | | 726/30 |

(Continued)

FOREIGN PATENT DOCUMENTS

| | | | |
|---|---|---|---|
| CN | 105260639 A | * | 1/2016 |
| WO | WO-2020161203 A1 | | 8/2020 |

OTHER PUBLICATIONS

"International Application Serial No. PCT/EP2020/052900, International Search Report dated May 12, 2020", 4 pgs.

(Continued)

*Primary Examiner* — Tri M Tran
(74) *Attorney, Agent, or Firm* — Schwegman Lundberg & Woessner, P.A.

(57) ABSTRACT

Various systems and methods for managing identity credentials on a mobile device are described herein. A verifier device may perform operations including receiving one or more data elements associated with a credential, wherein the data elements are signed with a signature associated with an issuer of the data elements, analyzing the signature to determine a confidence score, the confidence score enumerated into a plurality of confidence levels, configuring a verification process based on the confidence score, and executing the verification process.

20 Claims, 5 Drawing Sheets

(56) References Cited

U.S. PATENT DOCUMENTS

2018/0165781 A1\* 6/2018 Rodriguez ......... G06Q 20/3821
2018/0173871 A1 6/2018 Toth

OTHER PUBLICATIONS

"International Application Serial No. PCT/EP2020/052900, Written Opinion dated May 12, 2020", 6 pgs.
"Verisign(TM) CPS, Passage", Verisign CPS, XX, XX, 1-115.
"Canadian Application Serial No. 3,128,933, Examiners Rule 86(2) Report mailed Jan. 11, 2024", 4 pages.

\* cited by examiner

IDENTITY MANAGEMENT ON A MOBILE DEVICE

CROSS-REFERENCE TO RELATED APPLICATION(S)

The present application is a national stage application under 35 U.S.C. § 371 of International PCT Application No. PCT/EP2020/052900, titled "Identity Management on a Mobile Device," filed Feb. 5, 2020, which claims priority to U.S. Provisional Patent Application No. 62/801,371, titled "Identity Management and Verification Via Mobile Devices and Driving License Functionality on Mobile Device," filed Feb. 5, 2019, each of which is hereby incorporated herein by reference in its entirety.

TECHNICAL FIELD

Embodiments described herein generally relate to electronic credential systems, and in particular, to identity management on a mobile device.

BACKGROUND

Identity documents, such as identity cards, may have multiple pieces of information stored on them—referred as data elements. When in use, an identity card is read by a reader device, also referred to an interrogator or verifier device. Information stored on the identity card is often protected so that unauthorized reader devices are unable to access or decode the information. This may be accomplished using various forms of encryption or encoding. Additionally, in some systems, the information is stored with metadata to prove the authenticity of the information.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
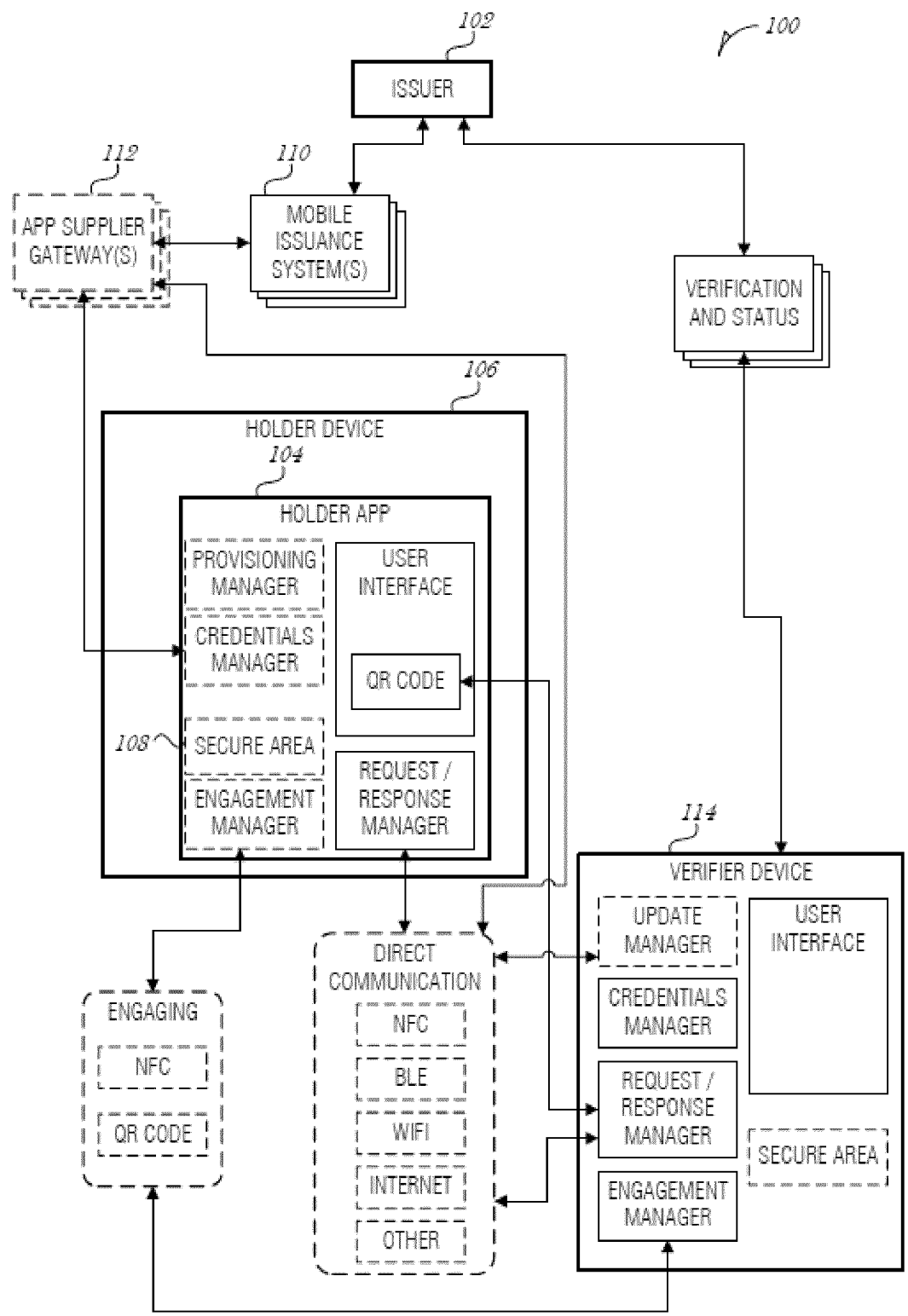
FIG. 1 is a block diagram illustrating a credential system, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Personal electronic identity cards and electronic passports are becoming more popular. Such cards may be issued by governments, schools, health care systems, or the like. To use a personal electronic identity card, a card reader (e.g., reader device or interrogator device) is used to read some or all of the information contained on the card. In order to trust the identity card, the reader device authenticates the data read. Authentication may include use of several forms of attestation including, but not limited to, authenticating the data source (e.g., Issuer), authenticating the data holder (e.g., end user), authenticating the data itself (e.g., freshness, checksum, signatures, etc.), or authenticating the application presenting the data on the card reader. Multiple confidence layers based on these types of attestation mechanism may be used to support a decision process of the card reader to authenticate the identity card.

The present disclosure describes an improved mechanism for stronger attestation and authenticity proofs of the data elements on an identity credential. Additional features are discussed below.

System Overview

Identity credentials (e.g., electronic documents, cards, mobile profiles, etc.) include information such as a first and last name, a date of birth, an address, etc. In the digital world, each piece of information is a data element and these data elements are combined into a package that is issued to a target user—the legitimate holder. Having a digital credential provides several advantages. Information and documentation are easy to access. Digital identity credentials may also be more immune to counterfeiting and corruption than conventional credentials.

Some terms are provided here for common reference. It is understood that these terms are non-limiting and that other terms, phrases, or descriptions of operations, components, or devices in the systems and methods described may be used.

Package—a Package is a collection of name:value pairs of data, which are referred to as data elements. The name of the data pair may be referred to as (or associated to) a Tag, Field, or Description. A Package may include metadata about the Package, such as a Package Hash, Package Signature, Package Expiration, or the like.

Identity Credential—an Identity Credential is a collection of data elements issued as one or more packages. An aggregated Identity Credential includes two or more packages. Data elements in a package may be included by referencing a data element in another package. A data element reference may retain the confidence level of the original referenced data element. An Identity Credential may include metadata describing the issuer of the credential, expiration or validity dates, or other information about the Identity Credential.

Issuer—an Issuer is a person, entity, service, or other platform that delivers and signs a Package. The Issuer may attest to the authenticity, validity, and correctness of data contained in the Package. The Issuer may sign the Package or sign individual data in the Package. The Issuer may be an Original Issuer, which is an Issuer that created the data, or a Re-Issuer, which is one that reuses the Original Issuer's data and either reference or duplicate such data in the issued package. An Issuer or Re-issuer may issue a Package as an Identity Credential.

Holder—a Holder is a person who is the legitimate owner of the information in the package or credential. For an identity package, the Holder matches with the identity information.

Holder device—the device where the Holder stores the received package. The Holder device may run a Holder App where such data are managed during presentation to a Verifier. The Holder may have an application (or "App") associated with it. A Holder App is an application that is stored, executing, or otherwise linked to the Holder. The Holder App may be a low-level application, such as a Basic Input Output System (BIOS) or other firmware, a system-level application (e.g., an operating system or a component of an operating system), a user-level application (e.g., an installed application on the Holder), or a remote application (e.g., a web-based application executing via a browser on the Holder).

Verifier—a Verifier is a person that operated a Verifier device to verify verifies data in a Package or Identity Credential on a Holder device. A Verifier device may obtain an Identity Credential from a Holder device, for example at a point-of-sale during a commercial transaction, and then validate the data. The Verifier device may use an app or other hardware on the Verifier device to interrogate the Holder device and obtain the credential information. Other forms of validation may be used, such as by analyzing data signatures, analyzing a blockchain, or the like. A Verifier device may verify the authenticity or validity of an Identity Credential. The Holder device and Verifier device may authenticate to one another before passing data.

Data that is provided by an Issuer may be signed by the Issuer. In some cases, data may be signed by the Holder device or a Holder App. Metadata that describes the data may be stored in the Package or Identity Credential and used to attest to the authenticity or validity of the data.

FIG. 1 is a block diagram illustrating a credential system 100, according to an embodiment. An issuing authority 102 (e.g., "Issuer") is an authority that issues data elements. The issuing authority 102 may sign the data elements. The issuing authority 102 may issue data elements to a Holder App 104. The issuing authority 102 may issue the data elements directly to the Holder App 104 or indirectly, such as by way of a Mobile Issuance System 110 and an App supplier gateway 112.

The Holder App 104 executes on a Holder device 106. Issued data elements may be stored in a secure area 108, which may be stored in the Holder App 104 or Holder device 106. The secure area 108 may be a secured operating system file, a Trusted Execution Environment (TEE), a Secure Element (SE), or some other protected data container. As such, the secure area 108 may be a hardware element of the Holder device 106.

A Verifier device 114 may be used to validate or authenticate data elements stored at the Holder device 108 or Holder App 102. The Verifier device 114 may be a card reader, point-of-sale (POS) system, or the like.

The Verifier device 114 and the Holder device 106 or Holder App 104 may "engage" with one another. Engaging may include a process of authenticating the Holder device 106 or Holder App 104 and the Verifier device 114 to one another. Engaging may be performed using various communication protocols, such as near-field communication (NFC), QR code or other means to exchange information to establish a direct communication using Bluetooth Low Energy (BLE), 802.11 wireless (Wi-Fi), the Internet, or the like.

The Verifier device 114 validates or authenticates the data elements received from the Holder App 104 or Holder device 106 and may further contact the issuing authorities 102 when necessary for example to complete the validation. In some cases the Verifier device 114 receives a token from the Holder app and uses it with the Issuer 102 to receive the data elements.

The various components of the credential system 100 may communicate over one or more networks, which may include any known type of network that facilitates machine-to-machine communications. The network may use the same communication protocols or different protocols without departing from the scope of the present disclosure. The network may include wired or wireless communication technologies. The Internet is an example of a communication network that constitutes an Internet Protocol (IP) network consisting of many computers, computing networks, and other communication devices located all over the world, which are connected through many telephone systems and other means. Other examples of a communication networks include, without limitation, a Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network need not be limited to any one network type, and instead may be comprised of several different networks or network types. Moreover, the network may include a number of different communication media such as coaxial cable, copper cable/wire, fiber-optic cable, antennas for transmitting/receiving wireless messages, and combinations thereof.

The Holder device 106 and Verifier device 114 may be of any type of compute device. The Holder device 106 is typically portable in nature, and may take the form of a cellular phone, mobile device, smart phone, personal digital assistant, laptop, tablet, wearable device, portable credential card, key fob, or the like. It should be appreciated that the Verifier device 114 does not necessarily have to take the form of a mobile device, but rather may be implemented as a part of a personal computer, desktop computer, kiosk, payment terminal, beacon, or the like.

During a transaction, a user with the Holder device 106 may be asked to present a credential or part of a credential to a Verifier device 114. The Verifier device 114 may be a point-of-sale terminal with a beacon, for example. The beacon may periodically attempt to connect with Holder devices 106 in communication range or within some threshold proximity. The Verifier device 114 may connect with the Holder device 106 over wireless communications (e.g., BLUETOOTH® or WI-FI), and obtain some or all of a credential from the Holder device 106. For instance, as the user approaches the checkout lane, the beacon may advertise a connection, which the Holder device 106 uses to connect with the beacon and construct a secure connection. The beacon may request certain credential information, such as a user's name and credit card number, and the Holder device 106 may respond with the information. The Verifier device 114 may validate the credential by accessing issuing authorities 102 or a credential database (not shown).

The interaction between the Holder device 106 and the Verifier device 114 may be controlled by a protocol and command set that is used to access data on the Holder device 106 from the Verifier device 114. In an embodiment, the protocol and command set are SEOS® CORE from HID GLOBAL CORPORATION.

Figure 2:
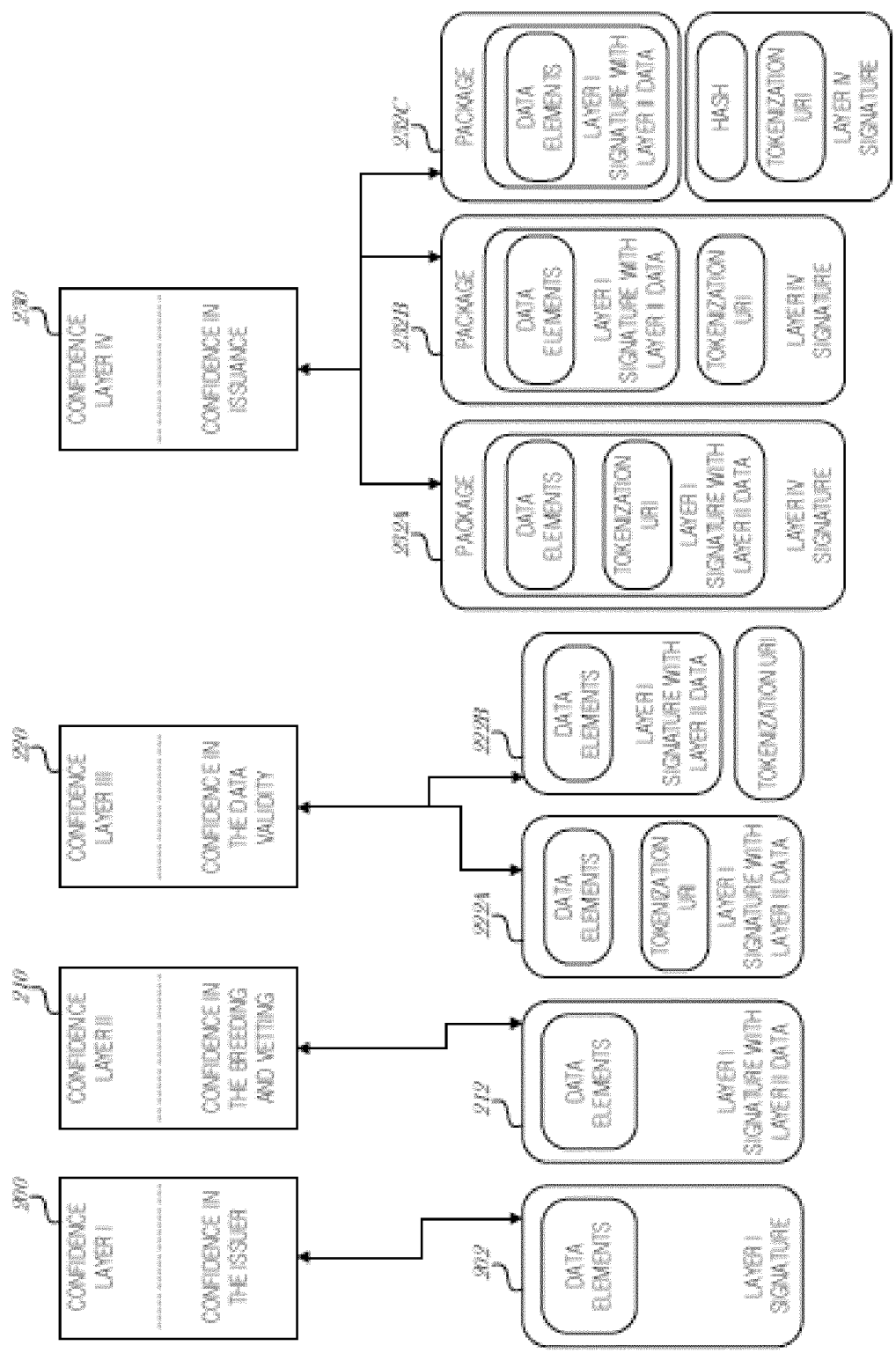
FIG. 2 is a block diagram illustrating confidence levels, according to an embodiment.

FIG. 2 is a block diagram illustrating confidence levels, according to an embodiment. Confidence levels are used to support the Verifier (e.g., Verifier device 114) when determining which method to use to validate or authenticate the data elements presented by a Holder. Confidence in data elements, credentials, data packages, or the like, may be based on multiple factors. These factors may include all or a subset of 1) Issuer trustworthiness, 2) data authenticity, 3) credential provisioning process, and 4) data freshness.

Issuer trustworthiness may be based on various factors, such as the identity of the Issuer, the relevance of the Issuer for the issued data elements, the relationship of the Issuer with the issued data, and the process the Issuer uses when issuing data. For instance, a government agency (e.g., state Department of Motor Vehicles) may have a higher trustworthiness value than an independent private company for an identity package. As another example, a university issuing a student degree to an identification credential may have higher trustworthiness than a private grocery store chain issuing the same information. Both the type of issuing entity and the type of credential being issued may affect the trustworthiness of the Issuer. As another example, an Issuer who is known to have a rigorous breeding and vetting process of applicants for credentials issued by the Issuer may have a higher trustworthiness than one that does not. Breeding and vetting is used by an Issuer to verify documents that are provided by a user to establish credential data. When analyzing a breeding or vetting process, questions may include multiple evidences, one or more means to match with the holder other than possession of a single or a few documents, is there electronic verification, is there visual verification, is it company declared, is it self-declared, etc. Issuer trustworthiness may be scaled (e.g., on a range of 1 to 5, 1 to 100, or the like).

Another factor used in confidence levels is Data Authenticity Factors. The issuer signature proves the data authenticity—who the issuer is—and allows for an integrity check. The process the Issuer has for signing may be captured in metadata and used as an indication of data authenticity. For example, using a hardware security module (HSM) in a secure backend may be considered more secure than signing with an unprotected key or having the Holder App sign data elements (e.g., the Holder device is not as trustfully as an HSM at the issuer). Where the signature key is stored may also be relevant and be used as a weight in the Data Authenticity Factor.

Another factor used in confidence levels is the Credential Provisioning Factors. If the secure area 108 is confirmed as such during provisioning, then confidence is higher. As another example, if the credential is provisioned to the Holder Device or App using trusted channels and stored in a TEE in the Holder Device, then confidence is higher based on this Credential Provisioning Factor. Similarly, if the credential is provisioned to the Holder over an encrypted channel to a confirmed secure element (SE), the trustworthiness of the credential may be assumed to be higher based on the data provenance. The SE may be validated or authenticated to ensure that it is not an imposter. Finally the method to confirm the legitimate holder prior to issuing the data is also relevant.

Another factors used in confidence levels is a Data Freshness Factor. Data freshness refers to when the data was created or issued in view of the current date or time. Data that is outdated, expired, or otherwise invalid, may not be trustworthy.

Considering the above factors, which are non-limiting examples, multiple confidence layers may be used to support the Verifier device to express a request including minimum levels but also whether adequate data is received in the decision process for selecting the right method to match the Holder with the information for proper identification. The Verifier device may request data elements having a minimum confidence level or signed confidence layer. These confidence levels and layers are used to prove the data integrity and data provenance.

Confidence Layer I is related to the Issuer Trustworthiness Factor. This layer is related not only to the Issuer breeding and vetting process but also whether the Issuer is qualified for the kind of document or credential and to which extend it is relevant. In an example, a Verifier device may check if the Issuer certificate is from a trusted authority for the kind of information expected by the Verifier device for the verification. Certificate classes may be used to designate the confidence level for a particular kind of document. For example, Class 1 documents may have had minimal vetting performed before issuing the document. Class 5 documents may have had multiple required correlated documents to prove the accuracy, validity, source, or other aspects of the document before being issued. Classes may be standardized and verified by a third party. As such, a certificate class may be used to inform about the strength of the Issuer for a given kind of document.

The relevance of the Issuer with respect to the issued data elements may be more important than the process itself. Some data elements, for example, may only be established in a legal identification by a government. Examples include a person's name, date of birth, various biometrics, portrait, issuing province (e.g., state, local, region, etc.), etc. As such, a government-issued identity is the strongest identity a citizen may possess. Other parties may issue data elements. Examples include utility providers that establish a verified address; medical facilities that establish biometric data (e.g., age, weight, height, etc.); civil registries for marital status, birthdate, death certificates, etc.; or education facilities that may issue course completion certificates, degrees, or the like.

Confidence Layer II is related to the Data Authenticity Factor and qualifies for most of the breeder document and vetting process. This may be used by the Verifier's risk policy to determine whether the document issued by a given Issuer is strong enough. The Data Authenticity Factor proves the Issuer and protects data integrity and other metadata related to Confidence Layer I. As such, information useful or required to identify the kind of breeding may be added to the certificate presented by the Issuing Authority to verify the digital signature. The referenced information may be as simple as an identifier informing about the kind of document used for breeding, but other information can be suitable. This information may be included in the certificate class number as a sub-number, e.g., 2.x where x informs about the breeding process. Data signed with a Confidence Layer I signature may be encapsulated with a Confidence Layer II signature.

Confidence Layer II signatures may be provided by the Issuer or by a third party. A Confidence Layer II signature may be included as a wrapper around Confidence Layer I signed data or may be stored as a separate independent signature.

Confidence Layer III is related to the Data Freshness Factor. Data signed with a Confidence Layer I or II signature may be encapsulated with a Confidence Layer III signature. This layer reflects the confidence in the validity of the data, for example whether the data is up to date, whether it comes from a device that is still authorized, etc. In particular, a Verifier device may rely on tokenization data when the "freshness" does not meet the risk policies, allowing the status of the data to be confirmed. The token may contain a uniform resource identifier (URI) to check the status of the data from a network location that only host the data status and not the data itself. Tokenization allows to shorter the life of the issued data independently from the expiration of the identity information. This ensures regular renewal of the data and therefore freshness.

Tokenization, as described further herein, allows taking advantage of the security of a backend system and can limit usage of the identity data in order to reduce the risk. Tokenization is new to the mobile identity field. Methods described herein allow for the Issuer to set the tokenization information or for the mobile credential issuance system to run separately. The approaches disclosed herein are different from tokenization utilized for payment applications, where the signature keys, independent from but related to the data, are tokenized, rather than the actual data.

Confidence Layer IV is related to the Provisioning Factor. Layer IV may be layered on top of III, II and/or I. Layer IV includes metadata and other structures to help the Verifier device evaluate the risk that information (and/or keys) may have been provisioned to an incorrect holder or extracted from the original device and potentially used by an improper or unauthorized holder. For example, Layer IV metadata may be used to indicate whether the data elements were provisioned directly to the Secure Area with a secure channel (or indirectly through TEE or rich OS), the security level of the Secure Area and whether such secure area was confirmed or not (e.g. authenticated as genuine).

The Secure Area may be dedicated hardware (HW), such as Samsung's embedded Secure Element (eSE), a TEE, or any other suitable protected area, or could be secured using rich OS security features. In general, the Secure Area may be comprised of HW or software (SW) or any combination of HW and SW. In an embodiment, the data provided may identify or provide a security level that takes into account the above parameters and/or other suitable parameters that help the Verifier device evaluate the risk that information (and/or keys) may have been extracted from the original device and potentially used by an improper or unauthorized holder. A certificate class may be used for carrying this information.

In general, confidence layers can provide information for a Verifier device to gauge, according to its policy/policies, the process to match data with a person for identity verification. For example, when the Issuer is trusted but the confidence level is not strong enough, the Verifier device may require additional factor(s) to match with the holder. This may help ensure that, at the time of presentation of the data, the proper or authorized holder is using the shared information.

Confidence in the identity is a result of execution of several phases in the identity management ecosystem. While the document presents the idea of confidence level being nested and the option to have a scaler value, many of these phases are independent from each other and do not necessarily complement one another. Therefore, a Confidence Vector may alternatively be conveyed to the verifying entity.

A confidence vector may be constructed as an aggregation of a numerical scale of each of the confidence levels. For instance, confidence layer I may have a score of 3 on a scale of 1 to 5, and confidence layer II may have a score of 4 on a scale of 1 to 5. The confidence vector in this case may be {3, 1, 0, 0}, where each value in the enumerated list of the vector is associated with confidence level I, II, III, and IV, respectively.

Considering a confidence vector allows a verifier device to request for independent minimum level for each layer and evaluate the returned data using each layer independently.

A layer itself may also be composed as a vector where multiple elements may be considered. For example, authentication factors may be considered as something you have but also something you are, which relate to a biometrics match. Such a match may be done on the holder device and information returned accordingly. A verifier device may request for authentication factors and may define minimum confidence scores for each independently.

FIG. 2 is a block diagram illustrating confidence layers and their corresponding data structures, according to various embodiments. A Confidence Layer I 200 is used to indicate confidence in the Issuer. Corresponding package 202 illustrates how the package may be signed with a Layer I type signature. The Layer I signature may be a signature of the Issuer to provide assurance of the data integrity and authenticity of the data elements of package 202. The Layer I signature may include other metadata to indicate the identity of the Issuer, where the data elements were signed, the origin of the signature, and other aspects.

A Layer II 210 is used to indicate confidence in breeding and vetting. A corresponding package 212 illustrates that the package is signed with both a Layer I type signature and a Layer II type metadata. The Layer I type signature is as described above and indicates confidence of the Issuer. The Layer II type metadata is used to indicate confidence in how the data was issued (e.g., the Data Authenticity Factor).

A Layer III 220 is used to indicate confidence in data validity. As described above, this may reflect the Credential Provisioning Factor and the Data Freshness Factor. Corresponding packages 222A and 222B illustrate that the package 222A, 222B is signed with a Layer I type signature and includes Layer II type metadata, along with a tokenization uniform resource identifier (URI). The URI is string of characters that uniquely identifies a resource. Examples of URIs include a uniform resource locator (URL) and a uniform resource name (URN). The tokenization URI is used to verify whether data is up to data (e.g., fresh) and valid. The URI may be referenced by a Verifier device to query for status information. In response to the query, the service may return a valid flag, a timestamp, or other information used to determine whether the data is fresh.

Package 222A includes the tokenization URI in the package with the data elements. Package 222B has a corresponding tokenization URI that is stored separate from the package 222B. Data in the data elements of package 222B may be used to identify the tokenization URI data.

A Layer IV 230 is used to indicate confidence in issuance. Layer IV signatures are used to indicate whether the data elements were provisioned securely (e.g., directly to an SE or TEE). Packages 232A, 232B, and 232C illustrate different data structures that may be used in to show Confidence Layer IV. Package 232A includes a Layer IV type signature of the package, which includes the data elements and tokenization data. Package 232B includes a Layer IV type signature around both a package and its corresponding tokenization data, which is stored separate from the package data. Package 232C includes a Layer IV type signature around the tokenization data, which may include a tokenization hash. In this case, the tokenization data may have Confidence Layer IV and the package may have a Confidence Layer II (Layer I type signature and Layer II type metadata).

It is understood that the examples illustrated in FIG. 2 are non-limiting. There may be multiple packages, tokenization URIs, and layer signatures or metadata in data structures and organizations other than that shown in FIG. 2. For instance, there may be multiple tokenization URIs for multiple data elements, and each tokenization URI may be separately signed with a Layer IV type signature. As another example, the multiple tokenization URIs may be signed with a single Layer IV type signature if the underlying data elements were issued in the same manner and from the same source.

As described above, tokenization is a way to verify whether data is up to data (e.g., current or fresh) and therefore valid. Tokenization may be used in conjunction with an Issuer signature. In this way, tokenization may complement the Issuer signature and provide an additional indication that the data is authentic and has integrity.

The tokenization data may include a URI or a timestamp. A URI may be in the form of a URL and be used by the Verifier device to check the freshness of the data. For example, the Verifier device may use the URL and access a server to query for the status of the data. The URL may include the address of the server and an identifier of the credential for which to check the status.

The timestamp may be compared to a current time to determine how long it has been since the data was issued, created, or produced. Multiple timestamps may be included. The Verifier device may use the timestamp data and based on certain policies, access the URL to check for data validity. As such, the timestamp may provide a rough gauge of freshness and the URL may provide a more complete set of freshness data.

As illustrated in FIG. 2, tokenization data may be bound to a package in various ways. In some cases, the Issuer may deliver the tokenization data, and such information may be embedded along with the data elements and signed with a Layer I Confidence Level, described above.

In some other cases, the tokenization can be managed by the mobile App issuance sub system and may be signed with a Layer IV Confidence Level, as described above. In such example configuration, the signature may embed the hash of the Layer I package as a reference or may apply to the aggregation of the Layer I package and the tokenization data. Still other suitable manners of binding the tokenization data to the package are envisioned and are within the scope of the present disclosure.

Tokenization data may provide information for a Verifier device to relatively quickly check the "freshness" of the information (e.g., determine when was the last time the App checked for updates with the backend for a given package) and accordingly use the URL to connect to the backend system and get a response that allows the Verifier device to confirm the data is up to date and valid. In an embodiment, this may be a binary result (e.g., a "yes"/"no" or "valid"/"invalid" answer), or other similar response, taking advantage of a token identifier embedded in the URL. In other embodiments, the URL query may result in a more a detailed response, for example, with the addition of more sophisticated information, such as but not limited to, a hash that can be matched to the package to confirm it is up to date and valid.

The tokenization methods described herein are unique in that tokenization is bound to the data, as opposed to being part of the data itself. In other words, tokenization data can be aggregated to the identification data. In contrast, for example, in conventional payment applications, the signature key part of the payment credentials is tokenized. Furthermore, in conventional payment applications, the tokenized key signs data on the end user device and the signature is verified on the backend side. In conventional payment applications, the backend can check whether the tokenization data is coming from an authorized channel (e.g., a mobile app provisioned with a specific key), and if not, the tokenization data can be considered non-valid. According to the tokenization methods described herein, the signature can come from the backend, and the information can be verified on the Verifier device while the tokenization data can be confirmed as valid by the backend. As such, an end result is similar to having the backend system be the main security enforcer.

In an embodiment, the Verifier risk policy takes into account information of one or more of the above described Confidence Layers to determine whether received data is genuine and valid, and accordingly could use "freshness" information to determine if it is necessary to obtain an up-to-date status.

In an embodiment, when the updated status demonstrates the received data is outdated, the Verifier device requests the App to check for an update and, if connected to a suitable or appropriate network, such as the Internet, inform the App that such update may take place through the Verifier device itself. In such case, the App acts as if connected to the Internet and relays the data to the Verifier device in a manner similar to an Internet gateway or proxy. Once completed, the Verifier device notifies the App whether the update was successful and proceeds accordingly.

A unique feature of embodiments of the present disclosure is that the Verifier device need not always be a conventional terminal/reader, where the App is passive and receives the necessary read and write commands to transfer the data to update. For example, in some implementations, when using a Bluetooth Low Energy (BLE) connection, for example, to transfer the data, the Verifier device may be a peripheral device to the App or mobile device. As such, the Verifier device need not drive the process or pass through update commands from a remote system (e.g., a TSM). For mobile credentials, the issuance and update may drive the process from the App issuing a command or commands. In such a configuration, there is uniqueness in issuing the command(s) to a peripheral device that is connected to both the App with, for example, BLE and to, for example, the Internet.

In addition to the methods and mechanisms described above, biometrics may be used to prove an identity. Instead of using biometrics to prove one's identity, biometrics may be used to prove that the identity card or media is genuine or that the person associated with information contained on the identity card. One or more biometric factor may be used in various implementations.

When initially capturing a biometric signature, the place and manner used to capture the biometric signature directly impacts how trustworthy the signature is considered. If the biometric signature is captured at the user's mobile device, it may not be as trustworthy as a signature that is captured by an Issuer's device. For instance, biometric data collected and maintained at a medical facility that uses secure capture devices and secure communication channels and storage, may be considered more trustworthy than a picture captured by a user's mobile device and stored in a photo library accessible by any application executing on the mobile device.

Figure 3:
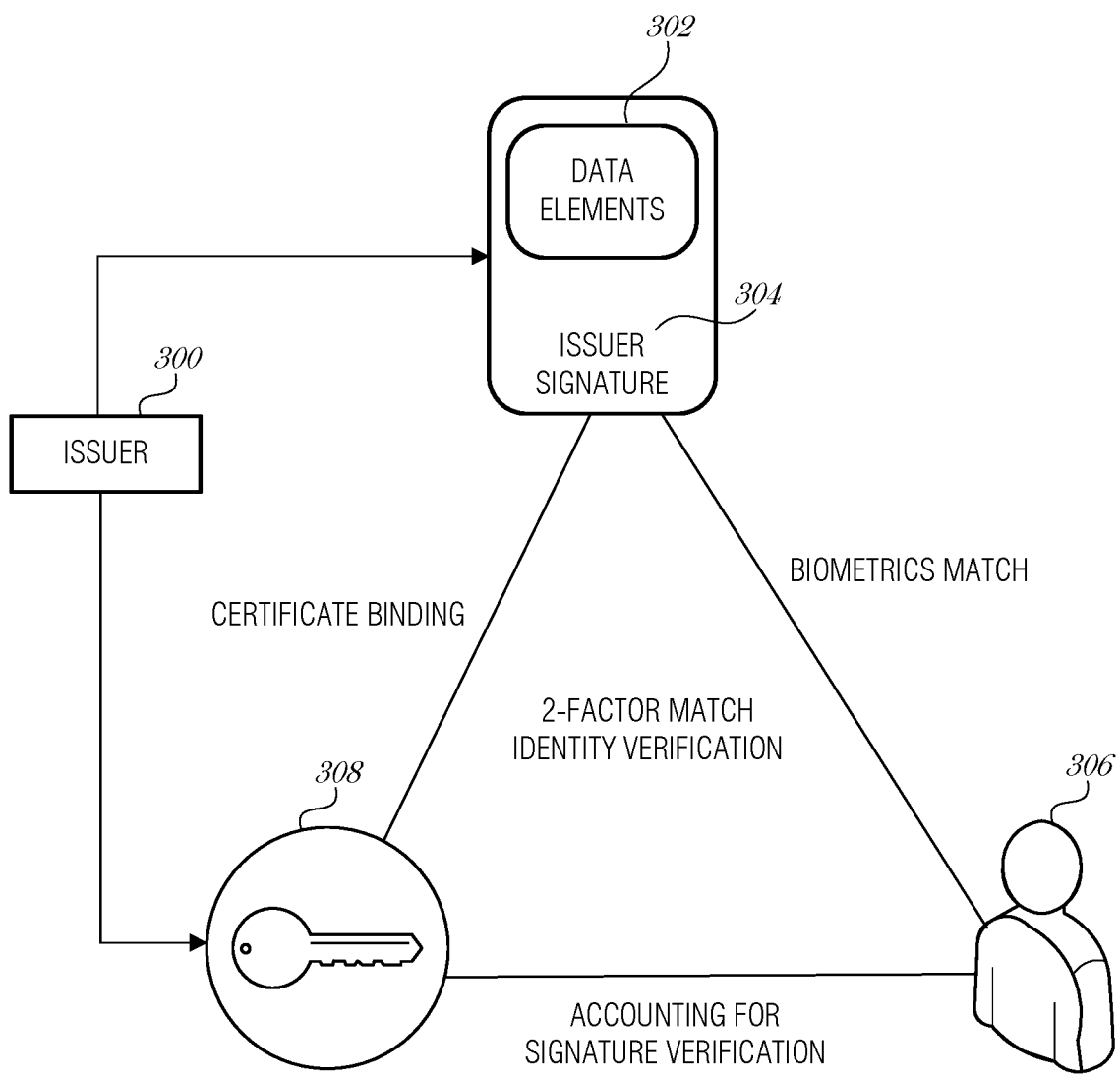
FIG. 3 is a block diagram illustrating a process that uses biometrics, according to an embodiment.

FIG. 3 is a block diagram illustrating a process that uses biometrics, according to an embodiment. An Issuer 300 issues data elements 302 and signs the data elements 302 with a signature 304. In the example illustrated in FIG. 3, the data elements include biometric data associated with a user 306. The user 306 may have a mobile device (not shown) that receives the signed data elements 302.

A tokenized key 308 is also on the user's mobile device. The key 308 may be tokenized by being specific to one holder device, one holder app or to the issued identity information. The tokenized key 308 is bound to the signed data elements 302. As such the tokenized key 308 may be used as an authentication factor to prove the device is linked to the same person whose identity is presented. Verification of information signed by that key proves it has been delivered by the device or app associated with the identity data. For instance, the tokenized key 308 may include metadata that has identification information of the data elements 302 or a package containing the data elements 302. In short the tokenized key 308 is linked to the identity information 302. Conversely, the package or data elements 302 may include metadata identifying the tokenized key 308. Binding may be confirmed in a one-way or two-way manner, depending on which elements have metadata of the other. For example the certificate for key 308 may be associated with the issued credentials referencing, for example, a unique identifier of such identity document. The tokenized key 308 provides one factor of a multi-factor authentication scheme. For instance, the tokenized key 308 may be used to prove possession of an object, or something you have. Restated, the mobile device is something you have bound to the mobile identity stored on the device and proved by the tokenized key 308. A second factor of a multi-factor authentication scheme may be something you. This may be proven using biometric data, which may be as simple as a portrait of the user reproduced on the mobile device, or more sophisticated as fingerprint, iris or other facial recognition used to verify the user's identity.

When the user presents the mobile device to a Verifier, the Verifier device will use the tokenized key 308 and the signed data elements 302 to prove the user's identity. The Verifier device accesses a URI contained in the tokenized key 308 to prove the validity of the tokenized key 308. The URI may also provide other encryption keys (e.g., a public key) or the like to allow the Verifier device to access the signed data elements 302. Based on the results of the tokenization look up, the Verifier is assured that the data elements are from the Issuer 300 and may use the data elements 302 to validate the user. The Verifier device may use a public key or other encryption key to decrypt the data elements 302 if they are encrypted by the Issuer 300. The tokenized key 308 may be used to limit the use or availability of the data elements 302. For instance, the tokenized key 308 may include a timestamp that is used to determine whether the data elements 302 are still fresh or valid.

Figure 4:
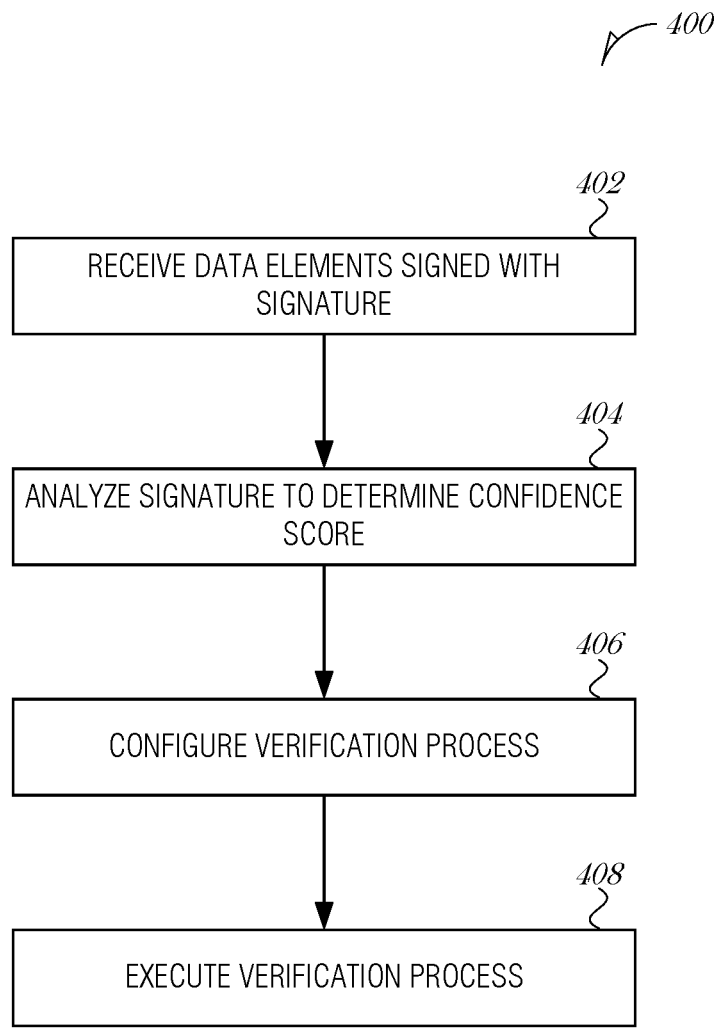
FIG. 4 is a flowchart of a method for implementing confidence levels in data verification, according to an embodiment.

FIG. 4 is a flowchart of a method 400 for implementing confidence levels in data verification, according to an embodiment. The method 400 may be performed by a verifier device, in an embodiment.

One or more data elements are received at a verifier device (operation 402). The data elements may be associated with a credential. The data elements are signed with a signature associated with an issuer of the data elements. The signature is analyzed to determine a confidence score (operation 404). The confidence score may be enumerated into a plurality of confidence levels with a first confidence level indicating a confidence in the issuer, a second confidence level indicating a confidence in the breeding or vetting, a third confidence level indicating a confidence in validity of the data elements, and a fourth confidence level indicating a confidence in an issuance process used by the issuer to issue the data elements. Dependent on the confidence score, the verifier device configures a verification process (operation 406).

In an optional initial operation, the method 400 includes transmitting a request for the data elements, the request including a minimum confidence score for the data elements. The minimum confidence score may be a scalar or vector value, depending on the implementation.

In an embodiment, the confidence levels are defined by the issuer.

In an embodiment, at least one of the confidence levels includes an indication of a certificate class, the certificate class designating a confidence for a particular kind of document.

In an embodiment, the verification process includes extracting a tokenization uniform resource identifier (URI) from the credential and using the URI to validate at least one of: the signature or the data elements.

In an embodiment, the verification process includes extracting a biometric data from the credential. The biometric data is compared to a capture sample obtained from a user presenting the credential to produce a result, and the result of the comparison is used to prove that an identity card or media storing the credential is presented by a legitimate holder.

In a further embodiment, the verification process includes obtaining a tokenized key, the tokenized key signed by the issuer and the tokenized key uniquely associated with at least one of: the credential, the data elements, or the user presenting the credential. Then, the tokenized key is validated using a signature of the issuer and the tokenized key and the biometric data are used in a multifactor authentication scheme to validate the user. In a further embodiment, the data elements include metadata identifying the tokenized key.

In an embodiment, the verification process includes determining a freshness score of the data elements and using the freshness score to determine if it is necessary to obtain up-to-date data elements.

In an embodiment, information signed by key 108 is delivered in the same transaction and the verifier also check that such signature is bound to the received identity data.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 5:
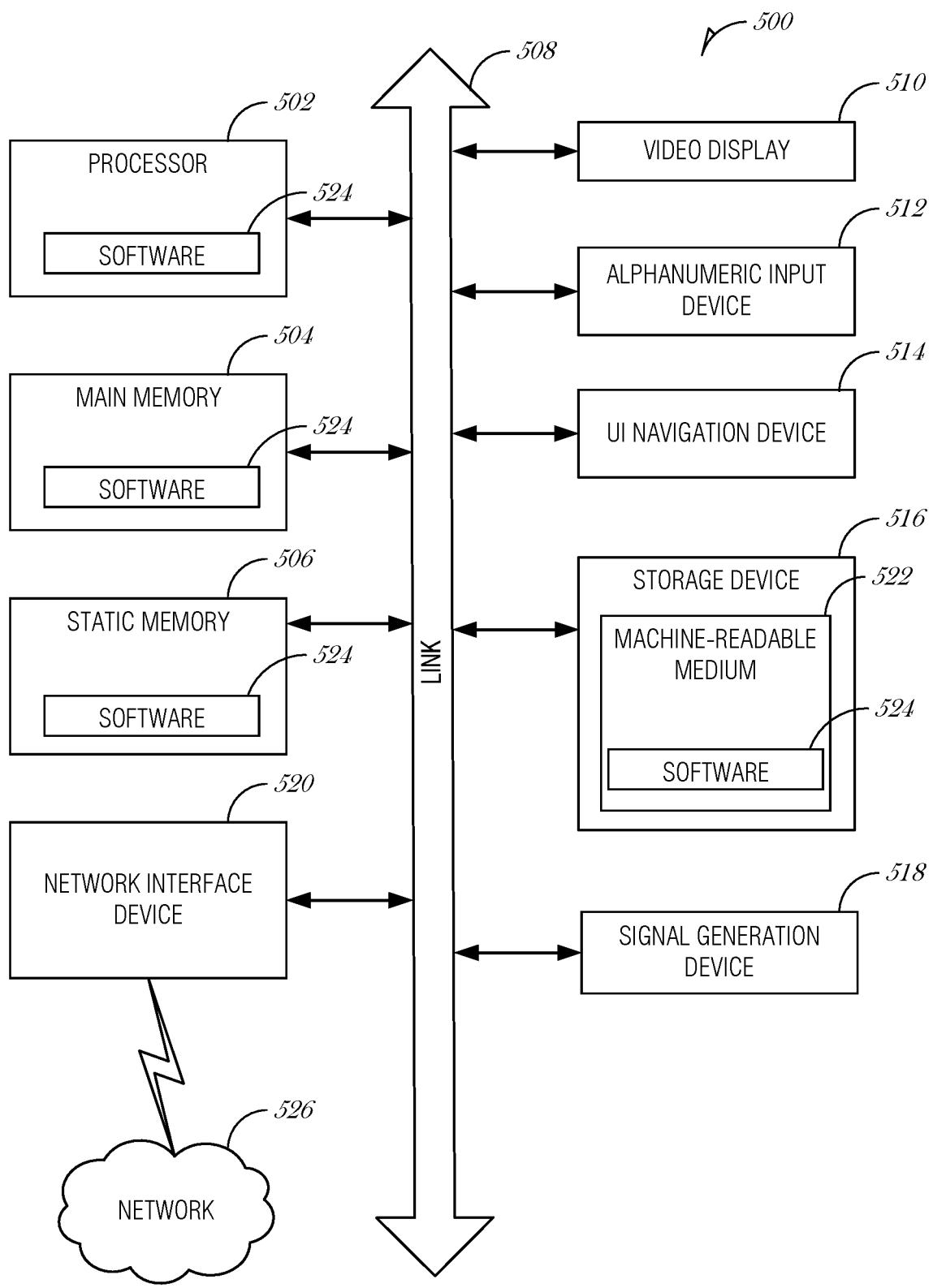
FIG. 5 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 5 is a block diagram illustrating a machine in the example form of a computer system 500, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a smart identification card, a smart credential, an electronic credential, a verifier device, a user device, a mobile device, a personal computer (PC), a tablet PC, a hybrid tablet, a personal digital assistant (PDA), a mobile telephone, a kiosk, a beacon, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other type of sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a verifier device comprising: a memory device; and a processor subsystem, which when configured by instructions stored on the memory device, is operable to perform operations comprising: receiving one or more data elements associated with a credential, wherein the data elements are signed with a signature associated with an issuer of the data elements; analyzing the signature to determine a confidence score, the confidence score enumerated into a plurality of confidence levels; configuring a verification process based on the confidence score; and executing the verification process.

In Example 2, the subject matter of Example 1 includes, wherein the plurality of confidence levels includes a first confidence level indicating a confidence in the issuer.

In Example 3, the subject matter of Examples 1-2 includes, wherein the plurality of confidence levels includes a second confidence level indicating a confidence in the breeding or vetting.

In Example 4, the subject matter of Examples 1-3 includes, wherein the plurality of confidence levels includes a third confidence level indicating a confidence in validity of the data elements.

In Example 5, the subject matter of Examples 1~4 includes, wherein the plurality of confidence levels includes a fourth confidence level indicating a confidence in an issuance process used by the issuer to issue the data elements.

In Example 6, the subject matter of Examples 1-5 includes, wherein the processor subsystem is operable to perform operations comprising transmitting a request for the data elements, the request including a minimum confidence score for the data elements.

In Example 7, the subject matter of Examples 1-6 includes, wherein the confidence levels are defined by the issuer.

In Example 8, the subject matter of Examples 1-7 includes, wherein at least one of the confidence levels includes an indication of a certificate class, the certificate class designating a confidence for a particular kind of document.

In Example 9, the subject matter of Examples 1-8 includes, wherein the verification process includes extracting a tokenization uniform resource identifier (URI) from the credential and using the URI to validate at least one of: the signature or the data elements.

In Example 10, the subject matter of Examples 1-9 includes, wherein the verification process includes: extracting a biometric data from the credential; comparing the biometric data and a capture sample obtained from a user presenting the credential to produce a result; and using the result of the comparison to prove that an identity card or media storing the credential is presented by a legitimate holder.

In Example 11, the subject matter of Example 10 includes, wherein the verification process includes: obtaining a tokenized key, the tokenized key signed by the issuer and the tokenized key uniquely associated with at least one of: the credential, the data elements, or the user presenting the credential; validating the tokenized key using a signature of the issuer; and using the tokenized key and the biometric data in a multifactor authentication scheme to validate the user.

In Example 12, the subject matter of Example 11 includes, wherein the data elements include metadata identifying the tokenized key.

In Example 13, the subject matter of Examples 1-12 includes, wherein the verification process includes: determining a freshness score of the data elements and; using the freshness score to determine whether to obtain up-to-date data elements.

Example 14 is a method comprising: receiving, at a verifier device, one or more data elements associated with a credential, wherein the data elements are signed with a signature associated with an issuer of the data elements; analyzing, at the verifier device, the signature to determine a confidence score, the confidence score enumerated into a plurality of confidence levels; configuring a verification process based on the confidence score; and executing the verification process.

In Example 15, the subject matter of Example 14 includes, wherein the plurality of confidence levels includes a first confidence level indicating a confidence in the issuer.

In Example 16, the subject matter of Examples 14-15 includes, wherein the plurality of confidence levels includes a second confidence level indicating a confidence in the breeding or vetting.

In Example 17, the subject matter of Examples 14-16 includes, wherein the plurality of confidence levels includes a third confidence level indicating a confidence in validity of the data elements.

In Example 18, the subject matter of Examples 14-17 includes, wherein the plurality of confidence levels includes a fourth confidence level indicating a confidence in an issuance process used by the issuer to issue the data elements.

In Example 19, the subject matter of Examples 14-18 includes, transmitting a request for the data elements, the request including a minimum confidence score for the data elements.

In Example 20, the subject matter of Examples 14-19 includes, wherein the confidence levels are defined by the issuer.

In Example 21, the subject matter of Examples 14-20 includes, wherein at least one of the confidence levels includes an indication of a certificate class, the certificate class designating a confidence for a particular kind of document.

In Example 22, the subject matter of Examples 14-21 includes, wherein the verification process includes extracting a tokenization uniform resource identifier (URI) from the credential and using the URI to validate at least one of: the signature or the data elements.

In Example 23, the subject matter of Examples 14-22 includes, wherein the verification process includes: extracting a biometric data from the credential; comparing the biometric data and a capture sample obtained from a user presenting the credential to produce a result; and using the result of the comparison to prove that an identity card or media storing the credential is presented by a legitimate holder.

In Example 24, the subject matter of Example 23 includes, wherein the verification process includes: obtaining a tokenized key, the tokenized key signed by the issuer and the tokenized key uniquely associated with at least one of: the credential, the data elements, or the user presenting the credential; validating the tokenized key using a signature of the issuer; and using the tokenized key and the biometric data in a multifactor authentication scheme to validate the user.

In Example 25, the subject matter of Example 24 includes, wherein the data elements include metadata identifying the tokenized key.

In Example 26, the subject matter of Examples 14-25 includes, wherein the verification process includes: determining a freshness score of the data elements and; using the freshness score to determine whether to obtain up-to-date data elements.

Example 27 is a machine-readable medium comprising instructions, which when executed by a processor subsystem, cause the processor subsystem to perform operations comprising: receiving, at a verifier device, one or more data elements associated with a credential, wherein the data elements are signed with a signature associated with an issuer of the data elements; analyzing, at the verifier device, the signature to determine a confidence score, the confidence score enumerated into a plurality of confidence levels; configuring a verification process based on the confidence score; and executing the verification process.

In Example 28, the subject matter of Example 27 includes, wherein the plurality of confidence levels includes a first confidence level indicating a confidence in the issuer.

In Example 29, the subject matter of Examples 27-28 includes, wherein the plurality of confidence levels includes a second confidence level indicating a confidence in the breeding or vetting.

In Example 30, the subject matter of Examples 27-29 includes, wherein the plurality of confidence levels includes a third confidence level indicating a confidence in validity of the data elements.

In Example 31, the subject matter of Examples 27-30 includes, wherein the plurality of confidence levels includes a fourth confidence level indicating a confidence in an issuance process used by the issuer to issue the data elements.

In Example 32, the subject matter of Examples 27-31 includes, transmitting a request for the data elements, the request including a minimum confidence score for the data elements.

In Example 33, the subject matter of Examples 27-32 includes, wherein the confidence levels are defined by the issuer.

In Example 34, the subject matter of Examples 27-33 includes, wherein at least one of the confidence levels includes an indication of a certificate class, the certificate class designating a confidence for a particular kind of document.

In Example 35, the subject matter of Examples 27-34 includes, wherein the verification process includes extracting a tokenization uniform resource identifier (URI) from the credential and using the URI to validate at least one of: the signature or the data elements.

In Example 36, the subject matter of Examples 27-35 includes, wherein the verification process includes: extracting a biometric data from the credential; comparing the biometric data and a capture sample obtained from a user presenting the credential to produce a result; and using the result of the comparison to prove that an identity card or media storing the credential is presented by a legitimate holder.

In Example 37, the subject matter of Example 36 includes, wherein the verification process includes: obtaining a tokenized key, the tokenized key signed by the issuer and the tokenized key uniquely associated with at least one of: the credential, the data elements, or the user presenting the credential; validating the tokenized key using a signature of the issuer; and using the tokenized key and the biometric data in a multifactor authentication scheme to validate the user.

In Example 38, the subject matter of Example 37 includes, wherein the data elements include metadata identifying the tokenized key.

In Example 39, the subject matter of Examples 27-38 includes, wherein the verification process includes: determining a freshness score of the data elements and; using the freshness score to determine whether to obtain up-to-date data elements.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A verifier device comprising:
   a memory device; and
   a processor subsystem, which when configured by instructions stored on the memory device, is operable to perform operations comprising:
      receiving one or more data elements associated with a credential, wherein the one or more data elements are signed with a signature associated with an issuer of the one or more data elements;
      analyzing the signature to determine a confidence score, the confidence score enumerated into a plurality of confidence levels, wherein the plurality of confidence levels provide respective scores including: a score of a confidence in validity of the one or more data elements, and a score of a confidence in issuance of the one or more data elements;
      configuring a verification process based on the respective scores enumerated in the confidence score; and
      executing the verification process.

2. The verifier device of claim 1, wherein the plurality of confidence levels includes a confidence level providing the score of the confidence in issuance of the one or more data elements as a numerical score, the numerical score indicating a confidence in the issuer.

3. The verifier device of claim 1, wherein the plurality of confidence levels includes a confidence level providing the score of the confidence in issuance of the one or more data elements as a numerical score, the numerical score indicating a confidence in a process used by the issuer for vetting applicants for credentials issued by the issuer, or a confidence in a process used by the issuer for evaluating one or more data sources that provide data used for the vetting.

4. The verifier device of claim 1, wherein the plurality of confidence levels includes a confidence level providing the score of the confidence in validity of the one or more data elements as a numerical score, the numerical score indicating the confidence in validity of the one or more data elements.

5. The verifier device of claim 1, wherein the plurality of confidence levels includes a confidence level providing the score of the confidence in issuance of the one or more data elements as a numerical score, the numerical score indicating a confidence in an issuance process used by the issuer to issue the one or more data elements.

6. The verifier device of claim 1, wherein the processor subsystem is operable to perform operations comprising transmitting a request for the one or more data elements, the request including a minimum confidence score for the one or more data elements.

7. The verifier device of claim 1, wherein the plurality of confidence levels are defined by the issuer.

8. The verifier device of claim 1, wherein at least one of the plurality of confidence levels includes an indication of a certificate class, the certificate class designating a confidence for a particular kind of document.

9. The verifier device of claim 1, wherein the verification process includes extracting a tokenization uniform resource identifier (URI) from the credential and using the tokenization URI to validate at least one of: the signature or the one or more data elements.

10. The verifier device of claim 1, wherein the verification process includes:
    extracting a biometric data from the credential;
    comparing the biometric data and a capture sample obtained from a user presenting the credential to produce a result; and
    using the result of the comparison to prove that an identity card or media storing the credential is presented by a legitimate holder.

11. The verifier device of claim 10, wherein the verification process includes:
    obtaining a tokenized key, the tokenized key signed by the issuer and the tokenized key uniquely associated with at least one of: the credential, the one or more data elements, or the user presenting the credential;
    validating the tokenized key using a signature of the issuer; and
    using the tokenized key and the biometric data in a multifactor authentication scheme to validate the user.

12. The verifier device of claim 11, wherein the one or more data elements include metadata identifying the tokenized key.

13. The verifier device of claim 1, wherein the verification process includes:
    determining a freshness score of the one or more data elements; and
    using the freshness score to determine whether to obtain up-to-date data elements.

14. A method comprising:
    receiving, at a verifier device, one or more data elements associated with a credential, wherein the one or more data elements are signed with a signature associated with an issuer of the one or more data elements;
    analyzing, at the verifier device, the signature to determine a confidence score, the confidence score enumerated into a plurality of confidence levels, wherein the plurality of confidence levels provide respective scores including: a score of a confidence in validity of the one or more data elements, and a score of a confidence in issuance of the one or more data elements;

configuring a verification process based on the respective scores enumerated in the confidence score; and executing the verification process.

15. The method of claim 14, wherein the plurality of confidence levels includes at least one of:
- a first confidence level providing a first numerical score, the first numerical score indicating a confidence in the issuer;
- a second confidence level providing a second numerical score, the second numerical score indicating a confidence in a process used by the issuer for vetting applicants for credentials issued by the issuer, or a confidence in a process used by the issuer for evaluating one or more data sources that provide data used for the vetting;
- a third confidence level providing a third numerical score, the third numerical score indicating the confidence in validity of the one or more data elements; or
- a fourth confidence level providing a fourth numerical score, the fourth numerical score indicating a confidence in an issuance process used by the issuer to issue the one or more data elements.

16. The method of claim 14, comprising transmitting a request for the one or more data elements, the request including a minimum confidence score for the one or more data elements.

17. The method of claim 14, wherein the verification process includes extracting a tokenization uniform resource identifier (URI) from the credential and using the URI to validate at least one of: the signature or the one or more data elements.

18. The method of claim 14, wherein the verification process includes:
- extracting a biometric data from the credential;
- comparing the biometric data and a capture sample obtained from a user presenting the credential to produce a result;
- using the result of the comparison to prove that an identity card or media storing the credential is presented by a legitimate holder;
- obtaining a tokenized key, the tokenized key signed by the issuer and the tokenized key uniquely associated with at least one of: the credential, the one or more data elements, or the user presenting the credential;
- validating the tokenized key using a signature of the issuer; and
- using the tokenized key and the biometric data in a multifactor authentication scheme to validate the user.

19. The method of claim 14, wherein the verification process includes:
- determining a freshness score of the one or more data elements; and
- using the freshness score to determine whether to obtain up-to-date data elements.

20. A machine-readable medium comprising instructions, which when executed by a processor subsystem, cause the processor subsystem to perform operations of claim 14.

\* \* \* \* \*